United States Patent
Chen et al.

(10) Patent No.: US 10,972,228 B2
(45) Date of Patent: *Apr. 6, 2021

(54) BASE STATION DEVICE, USER EQUIPMENT, WIRELESS COMMUNICATION SYSTEM, AND COMMUNICATION METHOD

(71) Applicant: FUJITSU LIMITED, Kawasaki (JP)

(72) Inventors: Hongyang Chen, Kawasaki (JP); Jianming Wu, Kawasaki (JP); Tsuyoshi Shimomura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/665,583

(22) Filed: Oct. 28, 2019

(65) Prior Publication Data

US 2020/0067653 A1 Feb. 27, 2020

Related U.S. Application Data

(63) Continuation of application No. 16/246,815, filed on Jan. 14, 2019, now Pat. No. 10,523,373, which is a (Continued)

(51) Int. Cl.
*H04L 1/18* (2006.01)
*H04L 1/00* (2006.01)
*H04L 1/16* (2006.01)

(52) U.S. Cl.
CPC .......... *H04L 1/1812* (2013.01); *H04L 1/0031* (2013.01); *H04L 1/0057* (2013.01);
(Continued)

(58) Field of Classification Search
CPC ... H04L 1/1812; H04L 1/0031; H04L 1/0057; H04L 1/0003
See application file for complete search history.

(56) References Cited

U.S. PATENT DOCUMENTS 8,780,817 B2 * 7/2014 Farajidana ............ H04L 1/1829
370/329
8,780,821 B2 * 7/2014 Zhang ................... H04L 5/0007
370/329
(Continued)

FOREIGN PATENT DOCUMENTS

JP 2012-165391 A 8/2012
WO 2016/175029 A1 11/2016

OTHER PUBLICATIONS

Extended European search report with supplementary European search report and the European search opinion issued by the European Patent Office for corresponding European Patent Application No. 17913874.8, dated Jun. 12, 2020.
(Continued)

*Primary Examiner* — Esaw T Abraham
(74) *Attorney, Agent, or Firm* — Myers Wolin, LLC

(57) ABSTRACT

A base station device including: a transmitter configured to transmit a transport block that includes a plurality of code block groups; and a receiver configured to receive a confirmation signal which indicates that one or more code block groups of the plurality of code block groups has not been successfully received, wherein the transmitter transmits a control signal when the receiver receives the confirmation signal, and the control signal comprises first information that indicates the one or more code block groups to be retransmitted and second information that indicates data is combined with the one or more code block groups being retransmitted and earlier received one or more code block groups stored in a buffer.

20 Claims, 17 Drawing Sheets

Related U.S. Application Data continuation of application No. PCT/JP2017/022196, filed on Jun. 15, 2017.

(52) U.S. Cl.
CPC .............. *H04L 1/16* (2013.01); *H04L 1/0003* (2013.01); *H04L 1/0009* (2013.01)

(56) References Cited

U.S. PATENT DOCUMENTS

| | | | | |
|---|---|---|---|---|
| 9,032,267 | B2* | 5/2015 | Shimanuki | H04L 1/1858 714/751 |
| 10,554,345 | B2* | 2/2020 | Nammi | H04L 1/0041 |
| 10,693,591 | B2* | 6/2020 | Yeo | H04L 1/1812 |
| 2009/0313516 | A1* | 12/2009 | Shin | H04L 1/0009 714/748 |
| 2012/0002657 | A1* | 1/2012 | Seyama | H04L 1/1628 370/338 |
| 2013/0010964 | A1* | 1/2013 | Fong | H04L 5/0092 380/277 |
| 2015/0195818 | A1* | 7/2015 | Davydov | H04W 72/042 370/329 |
| 2016/0226643 | A1 | 8/2016 | Mallik et al. | |
| 2018/0145797 | A1 | 5/2018 | Yeo et al. | |
| 2019/0053201 | A1 | 2/2019 | Nammi et al. | |

OTHER PUBLICATIONS

Qualcomm Incorporated, "Use cases of multi-bit HARQ-ACK feedback", Agenda Item: 7.1.3.3.5, 3GPP TSG-RAN WG1 Meeting #89, R1-1708633, Hangzhou, China, May 15-9, 2017.
HTC, "Discussion on CBG-based HARQ feedback", Agenda Item: 7.1.3.3.5, 3GPP TSG-RAN WG1 Meeting #89, R1-1708876, Hangzhou, P.R. China, May 15-19, 2017.
Qualcomm Incorporated, "Use cases of multi-bit HARQ-ACK feedback", Agenda Item: 7.1.3.3.5, 3GPP TSG RAN WG1 Meeting #89, R1-1708633, Hangzhou, China, May 15-19, 2017.
CATT, "Further details of CBG-based HARQ transmission", Agenda Item: 7.1.3.3.5, 3GPP TSG-RAN WG1 Meeting #89, R1-1707514, Hangzhou, P.R. China, May 15-19, 2017.
3GPP TS 36.211 V14.2.0, "3rd Generation Partnership Project; Technical Specification Group Radio Access Network; Evolved Universal Terrestrial Radio Access (E-UTRA); Physical channels and modulation (Release 14)", Mar. 2017.
3GPP TS 36.212 V14.2.0, "3rd Generation Partnership Project; Technical Specification Group Radio Access Network; Evolved Universal Terrestrial Radio Access (E-UTRA); Multiplexing and channel coding (Release 14)", Mar. 2017.
3GPP TS 36.213 V14.2.0, "3rd Generation Partnership Project; Technical Specification Group Radio Access Network; Evolved Universal Terrestrial Radio Access (E-UTRA); Physical layer procedures (Release 14)", Mar. 2017.
3GPP TS 36.300 V14.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", Mar. 2017.
3GPP TS 36.321 V14.2.0, "3rd Generation Partnership Project; Technical Specification Group Radio Access Network; Evolved Universal Terrestrial Radio Access (E-UTRA); Medium Access Control (MAC) protocol specification (Release 14)", Mar. 2017.
3GPP TS 36.322 V14.0.0, "3rd Generation Partnership Project; Technical Specification Group Radio Access Network; Evolved Universal Terrestrial Radio Access (E-UTRA); Radio Link Control (RLC) protocol specification (Release 14)", Mar. 2017.
3GPP TS 36.323 V14.2.0, "3rd Generation Partnership Project; Technical Specification Group Radio Access Network; Evolved Universal Terrestrial Radio Access (E-UTRA); Packet Data Convergence Protocol (PDCP) specification (Release 14)", Mar. 2017.
3GPP TS 36.331 V14.2.0, "3rd Generation Partnership Project; Technical Specification Group Radio Access Network; Evolved Universal Terrestrial Radio Access (E-UTRA); Radio Resource Control (RRC); Protocol specification (Release 14)", Mar. 2017.
3GPP TS 36.413 V14.2.0, "3rd Generation Partnership Project; Technical Specification Group Radio Access Network; Evolved Universal Terrestrial Radio Access Network (E-UTRAN); S1 Application Protocol (S1AP) (Release 14)", Mar. 2017.
3GPP TS 36.423 V14.2.0, "3rd Generation Partnership Project; Technical Specification Group Radio Access Network; Evolved Universal Terrestrial Radio Access Network (E-UTRAN); X2 application protocol (X2AP) (Release 14)", Mar. 2017.
3GPP TS 36.425 V14.0.0, "3rd Generation Partnership Project; Technical Specification Group Radio Access Network; Evolved Universal Terrestrial Radio Access Network (E-UTRAN); X2 interface user plane protocol (Release 14)", Mar. 2017.
3GPP TR 38.801 V14.0.0, "3rd Generation Partnership Project; Technical Specification Group Radio Access Network; Study on new radio access technology: Radio access architecture and interfaces (Release 14)", Mar. 2017.
3GPP TR 38.802 V14.0.0, "3rd Generation Partnership Project; Technical Specification Group Radio Access Network; Study on New Radio Access Technology Physical Layer Aspects (Release 14)", Mar. 2017.
3GPP TR 38.803 V14.0.0, "3rd Generation Partnership Project; Technical Specification Group Radio Access Network; Study on New Radio Access Technology; Rf and co-existence aspects (Release 14)", Mar. 2017.
3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.
3GPP TR 38.900 V14.2.0, "3rd Generation Partnership Project; Technical Specification Group Radio Access Network; Study on channel model for frequency spectrum above 6 GHz (Release 14)", Dec. 2016.
3GPP TR 38.912 V14.0.0, "3rd Generation Partnership Project; Technical Specification Group Radio Access Network; Study on New Radio (NR) access technology (Release 14)", Mar. 2017.
3GPP TR 38.913 V14.0.0, "3rd Generation Partnership Project; Technical Specification Group Radio Access Network; Study on Scenarios and Requirements for Next Generation Access Technologies; (Release 14)", Oct. 2016.
International Search Report issued by the Japan Patent Office for corresponding International Patent Application No. PCT/JP2017/022196, dated Sep. 5, 2017.
Written Opinion of the International Searching Authority issued by the Japan Patent Office for corresponding International Patent Application No. PCT/JP2017/022196, dated Sep. 5, 2017, with an English translation.
Huawei et al., "Scheduling mechanisms for CBG-based retransmission", Agenda Item: 7.1.3.3.5, 3GPP TSG-RAN WG1 Meeting #89, R1-1706962, Hangzhou, China, May 15-19, 2017.
NTT Docomo, Inc., "CBG based (re)transmission, preemption indication and subsequent transmission in NR", Agenda Item: 7.1.3.3.5, 3GPP TSG-RAN WG1 Meeting #89, R1-1708484 (Document labeled R1-1708384 on the face), Hangzhou, P.R. China, May 15-19, 2017, retrieved from [https://portal.3gpp.org/ngppapp/CreateTdoc.aspx? mode=view&contributionId=789354].
Non-Final Office Action issued by the USPTO dated May 23, 2019 for corresponding U.S. Appl. No. 16/246,815.
Notice of Allowance issued by the USPTO dated Sep. 5, 2019 for corresponding U.S. Appl.No. 16/246,815.
Notice of Preliminary Rejection issued by the Korean Intellectual Property Office for corresponding Korean Patent Application No. 10-2019-7034880, dated Oct. 15, 2020, with English translation.
HTC, "Discussion on CBG-based Retransmission", Agenda item: 7.1.3.3.5, 3GPP TSG RAN WG1 Meeting #89, R1-1708872, Hangzhou, P.R. China, May 15-19, 2017.
Samsung, "Overview of CBG-based retransmission in NR", Agenda Item: 8.1.3.3.2, 3GPP TSG RAN WG1 Meeting #88bis, R1-1705401, Spokane, USA, Apr. 3-7, 2017.

(56) References Cited

OTHER PUBLICATIONS

LG Electronics, "Discussion on DCI contents", Agenda Item: 7.1.3.1.4, 3GPP TSG RAN WG1 Meeting #89, R1-1707632, Hangzhou, P.R. China, May 15-19, 2017.
Notice of Reasons for Refusal issued by the Japan Patent Office for corresponding Japanese Patent Application No. 2019-524671, dated Jan. 5, 2021, with an English translation.

* cited by examiner

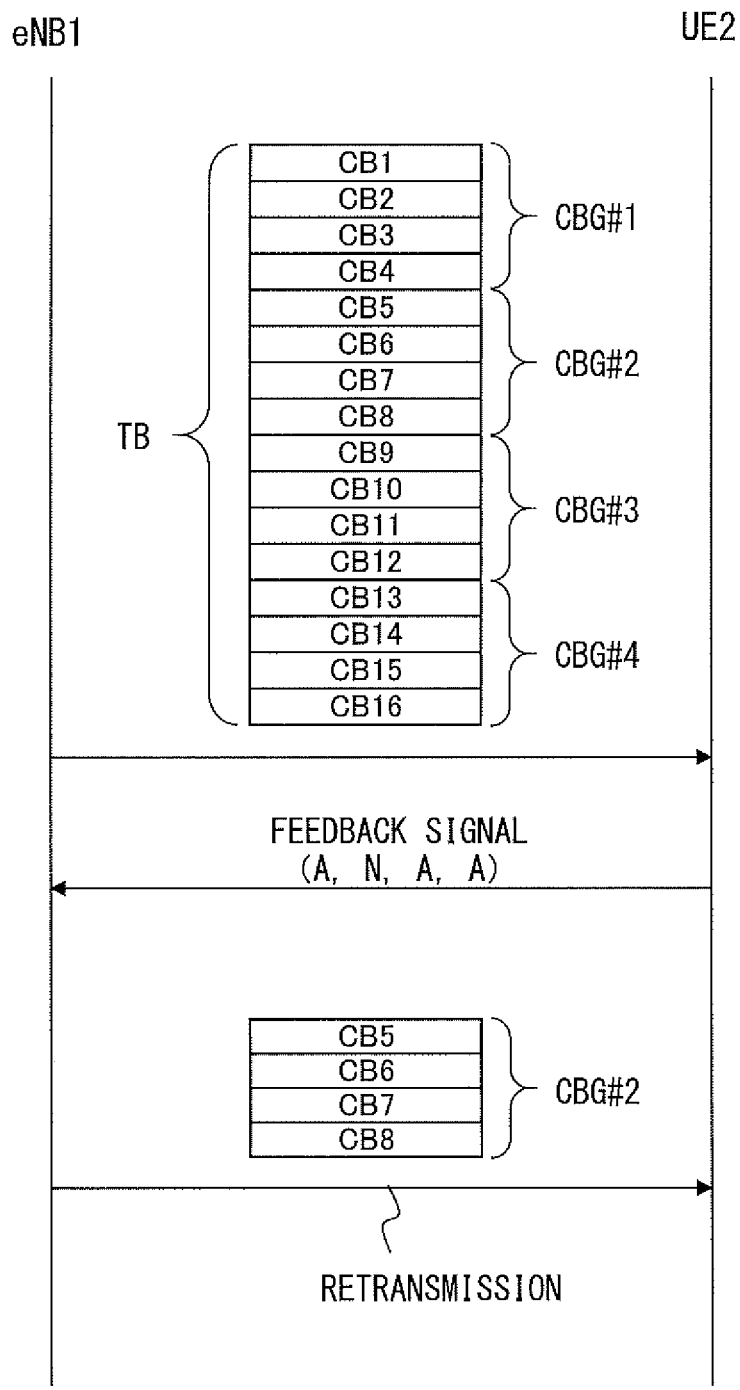
F I G. 1

| CBG-I | MEANING (NDI) | PROCESS BY eNB | PROCESS BY UE |
|---|---|---|---|
| 0000 | NEW DATA (NEW TB) | TRANSMISSION OF NEW TB | BUFFER CLEARING FOR TB |
| 0001<br>0010<br>0011<br>0111<br>...<br>1110 | OLD DATA | RETRANSMISSION OF SPECIFIED CBG | SOFT COMBINING OR BUFFER CLEARING FOR SPECIFIED CBG |
| 1111 | OLD DATA | RETRANSMISSION OF TB | SOFT COMBINING OR BUFFER CLEARING FOR TB |

FIG. 5A

| CBG-I | TRANSMISSION/RETRANSMISSION CBG | | | | MEANING (NDI) | PROCESS BY eNB | PROCESS BY UE |
|---|---|---|---|---|---|---|---|
| | CBG #1 | CBG #2 | CBG #3 | CBG #4 | | | |
| 000 | I | I | I | I | NEW DATA | TRANSMISSION OF NEW TB | BUFFER CLEARING FOR TB |
| 001 | R | – | – | – | OLD DATA | RETRANSMISSION OF SPECIFIED CBG | SOFT COMBINING OR BUFFER CLEARING FOR SPECIFIED CBG |
| 010 | – | R | – | – | | | |
| 011 | – | – | R | – | | | |
| 100 | – | – | – | R | | | |
| 101 | R | R | R | – | OLD DATA | | |
| 110 | – | R | R | R | OLD DATA | RETRANSMISSION OF TB | SOFT COMBINING OR BUFFER CLEARING FOR TB |
| 111 | R | R | R | R | OLD DATA | | |

FIG. 5B

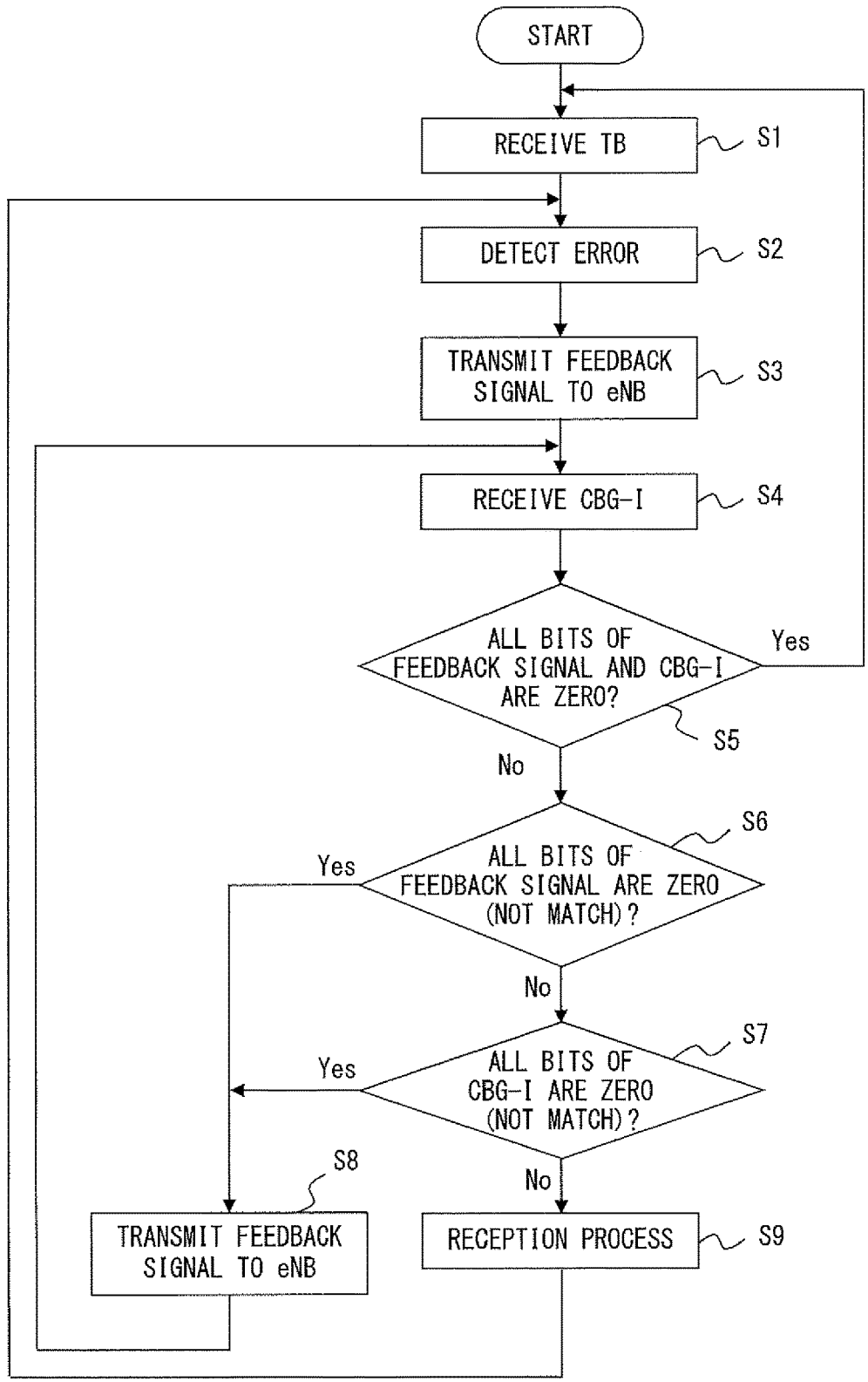
F I G. 8

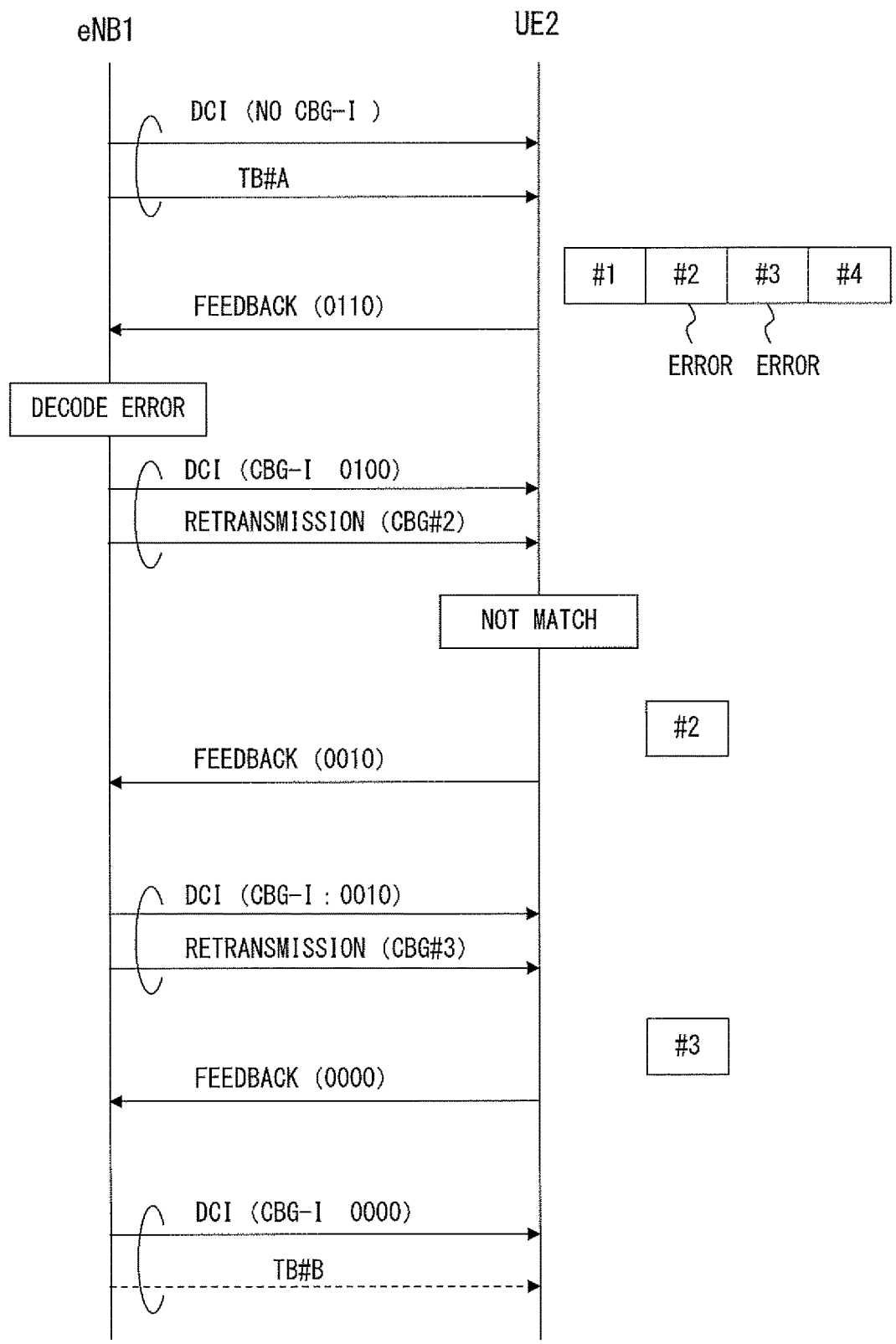
F I G. 1 0

| CBG-I | BUFFER INFORMATION | PROCESS BY UE | PROCESS BY eNB |
|---|---|---|---|
| 0001 | 0 | SOFT COMBINING | RETRANSMISSION OF SPECIFIED CBG |
| | 1 | BUFFER CLEARING FOR SPECIFIED CBG | |
| 0010 | | | |
| 0011 | | | |
| ... | | | |
| 1110 | | | |
| 1111 | 0 | SOFT COMBINING | RETRANSMISSION OF TB |
| | 1 | BUFFER CLEARING FOR TB | |

F I G. 1 2

| CBG-NDI | MEANING (NDI) | PROCESS BY eNB | PROCESS BY UE |
|---|---|---|---|
| 1111 | NEW DATA (NEW TB) | TRANSMISSION OF NEW TB | BUFFER CLEARING FOR TB |
| 0001<br>0010<br>0011<br>0111<br>...<br>1110 | OLD DATA | RETRANSMISSION OF SPECIFIED CBG | SOFT COMBINING OR BUFFER CLEARING FOR SPECIFIED CBG |
| 0 | OLD DATA | RETRANSMISSION OF TB | SOFT COMBINING OR BUFFER CLEARING FOR TB |

FIG. 13

BASE STATION DEVICE, USER EQUIPMENT, WIRELESS COMMUNICATION SYSTEM, AND COMMUNICATION METHOD

CROSS-REFERENCE TO RELATED APPLICATION

This application is a continuation application of U.S. application Ser. No. 16/246,815, filed Jan. 14, 2019, now U.S. Pat. No. 10,523,373, which is a continuation of International Application PCT/JP2017/022196 filed on Jun. 15, 2017 and designated the U.S., the entire contents of which are incorporated herein by reference.

FIELD

The embodiments discussed herein are related to a base station device, a user equipment, a wireless communication device, and a communication method.

BACKGROUND

Traffic for mobile terminals (such as smartphones, feature phones, etc.) occupies most resources of recent networks. The amount of traffic used by mobile terminals tends to increase in the future as well.

Meanwhile, there is an increasing demand for a capability to respond to services with various requirement conditions, accompanying the development of IoT (Internet of things) services (such as transportation systems, smart meters, monitoring systems for devices, etc.). This leads to a demand for a technique that achieves a higher data rate, a greater capacity, and a smaller delay in a next-generation communication standard (for example 5G (Fifth Generation Mobile Communications)) in addition to the 4G (Fourth Generation Mobile Communications) standard techniques (for example Non-Patent Documents 1 through 11). Note that working groups of the 3GPP are discussing next-generation communication standards (such as for example TSG-RAN WG1, TSG-RANWG2, etc.) (Non-Patent Documents 12 through 18).

Further, in order to provide a variety kinds of services, many use cases that are classified into Enhanced Mobile Broadband (eMBB), massive Machine Type Communications (mMTC), Ultra-Reliable and Low Latency Communication (URLLC), and others are proposed to be supported in the 5G.

LTE (Fourth Generation Communications scheme) etc. employ a technique of hybrid automatic repeat request (HARQ) to implement highly efficient data transport. According to HARQ, for example, a receiver requests a source device to perform a retransmission when received data was not successfully decoded in a process based on a layer-1 protocol such as LTE etc. In response to the request for the data retransmission, the source device transmits retransmission data corresponding to the data that was not successfully decoded in the receiver. The receiver combines the data that was not successfully decoded and the retransmission data so as to decode the data. This enables highly efficient and highly accurate retransmission control. Note that when the receiver decodes data successfully, the receiver transmits ACK information to the source device, and when the receiver fails to decode data successfully, the receiver transmits NACK information to the source device.

Incidentally, 1-bit feedback information that represents ACK/NACK is reported for, for example, a 14-symbol Transmission Time Interval (TTI) in recent LTE-based wireless communication systems. Also, a group of the 3GPP agreed to a scheme in which feedback information that represents ACK/NACK is reported for each code block group (Code Block Group or CBG) (Non-Patent Document 13). In that case, feedback information for each code block group uses one bit. Also, the number of symbols that forms a code block group is for example smaller than or equal to 14.

PRIOR ART DOCUMENTS

Patent Documents

[Patent Document 1] Japanese Laid-open Patent Publication No. 2012-165391
[Patent Document 2] International Publication Pamphlet No. WO 2016/175029

Non-Patent Documents

[Non-Patent Document 1] 3GPP TS 36.211 V14.2.0 (2017-03)
[Non-Patent Document 2] 3GPP TS 36.212 V14.2.0 (2017-03)
[Non-Patent Document 3] 3GPP TS 36.213 V14.2.0 (2017-03)
[Non-Patent Document 4] 3GPP TS 36.300 V14.2.0 (2017-03)
[Non-Patent Document 5] 3GPP TS 36.321 V14.2.0 (2017-03)
[Non-Patent Document 6] 3GPP TS 36.322 V14.0.0 (2017-03)
[Non-Patent Document 7] 3GPP TS 36.323 V14.2.0 (2017-03)
[Non-Patent Document 8] 3GPP TS 36.331 V14.2.0 (2017-03)
[Non-Patent Document 9] 3GPP TS 36.413 V14.2.0 (2017-03)
[Non-Patent Document 10] 3GPP TS 36.423 V14.2.0 (2017-03)
[Non-Patent Document 11] 3GPP TS 36.425 V14.0.0 (2017-03)
[Non-Patent Document 12] 3GPP TR 38.801 V14.0.0 (2017-03)
[Non-Patent Document 13] 3GPP TR 38.802 V14.0.0 (2017-03)
[Non-Patent Document 14] 3GPP TR 38.803 V14.0.0 (2017-03)
[Non-Patent Document 15] 3GPP TR 38.804 V14.0.0 (2017-03)
[Non-Patent Document 16] 3GPP TR 38.900 V14.2.0 (2016-12)
[Non-Patent Document 17] 3GPP TR 38.912 V14.0.0 (2017-03)
[Non-Patent Document 18] 3GPP TR 38.913 V14.0.0 (2017-03)

The scheme in which feedback information that represents ACK/NACK is reported for each code block group (CBG) is expected to use as many bits as the current scheme or more. This increases a possibility that the decoding of feedback information that represents ACK/NACK will be affected by a decode error. Thus, there is a demand for a method that reduces the influence of a decode error in the decoding of feedback information that represents ACK/NACK.

SUMMARY

According to an aspect of the present invention, a base station device a base station device includes: a transmitter configured to transmit a transport block that includes a plurality of code block groups; and a receiver configured to receive a confirmation signal which indicates that one or more code block groups of the plurality of code block groups has not been successfully received. The transmitter configured to transmit a control signal. The control signal comprises a first information indicates the one or more code block groups to be retransmitted and a second information bit indicates either the one or more code block groups being retransmitted are combinable with the received one or more code block groups or the received one or more code block groups corresponding to the one or more code block groups being retransmitted is corrupted.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of a HARQ;

FIG. 5A illustrates an example of a CBG indicator (CBG-I);

FIG. 5B illustrates another example of a CBG indicator (CBG-I);

FIG. 8 is a flowchart illustrating an example of a process performed by a user equipment;

FIG. 10 illustrates another example of a sequence of HARQ;

FIG. 12 illustrates an example of a HARQ that uses buffer information;

FIG. 13 illustrates another example of a control signal for detecting a decode error of a feedback signal;

DESCRIPTION OF EMBODIMENTS

The wireless communication system according to an embodiment of the present invention includes a base station (enhanced node B or eNB) 1 and a user equipment (or UE) 2. However, the base station 1 is not limited to eNB. Also, the base station 1 and the user equipment 2 can perform a hybrid automatic repeat request (HARQ).

FIG. 1 illustrates an example of a hybrid automatic repeat request. In this example, data to be transmitted from the base station 1 to the user equipment 2 is stored in transport block TB. Transport block TB stores a plurality of code block groups CBG. In the example illustrated in FIG. 1, transport block TB stores four code block groups CBG: code block groups CBG #1 through CBG #4. Further, each code block group CBG stores one or a plurality of code blocks CB. In the example illustrated in FIG. 1, each code block group CBG stores four code blocks CB.

Note that transport block TB is an example of a "transmission block". Each code block group CBG is an example of a "bit string block". Each code block is an example of a "data unit".

A cyclic redundancy check (CRC) is added to each code block CB. A CRC is an example of an error detection code. Therefore, the user equipment 2 can detect whether there is an error for each code block CB. Then the user equipment 2 determines whether data has been received successfully for each code block group CBG.

The user equipment 2 generates a confirmation signal indicating whether the data has been received successfully. The confirmation signal represents ACK or NACK for each code block group CBG. ACK indicates that the code block group CBG has been successfully received, and NACK indicates that the code block group CBG has not been successfully received. Thus, the reception result for each code block group CBG (ACK/NACK) is represented by one bit. The user equipment 2 then transmits this confirmation signal to the base station 1. That is, the reception state of each code block group CBG is fed back from the user equipment 2 the base station 1. This confirmation signal may be referred to as a feedback signal (or an ACK/NACK signal) in the descriptions below.

In the example illustrated in FIG. 1, an error is detected in code block group CBG #2. Thus, the user equipment 2 transmits the feedback signal "A, N, A, A" to the base station 1. "A" represents ACK, and "N" represents NACK.

When receiving this feedback signal, the base station 1 recognizes that the user equipment 2 has failed to receive code block group CBG #2 successfully. The base station 1 then retransmits code block group CBG #2 to the user equipment 2. The user equipment 2 utilizes the retransmitted code block group CBG #2 to recover data stored in the code block group CBG #2.

Figure 2:
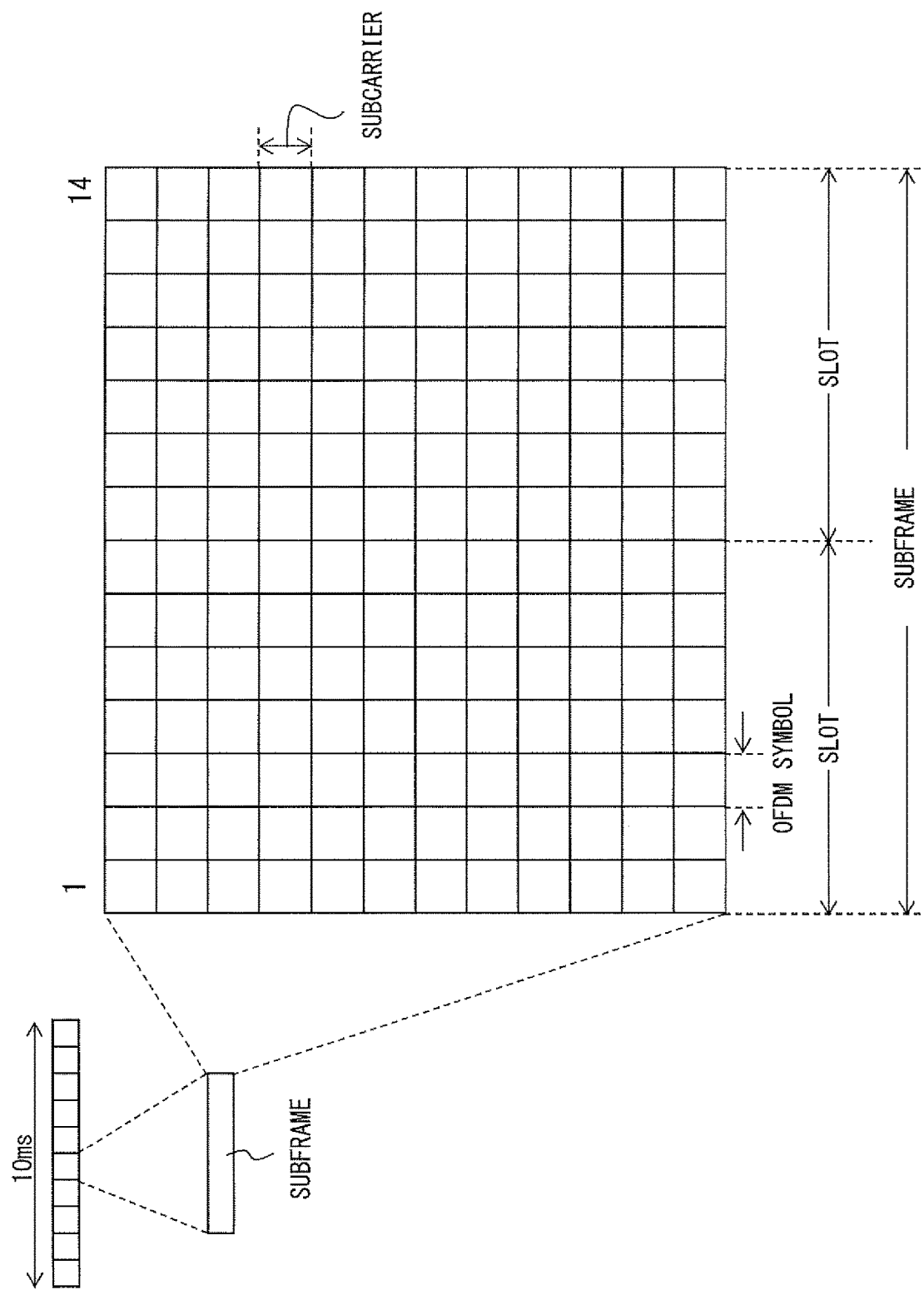
FIG. 2 illustrates an example of a frame that is transported in a wireless communication system.

In this example, transport block TB or code block group CBG is transported in a frame as illustrated in FIG. 2. A length of the frame is 10 milliseconds. The frame includes 10 subframes. That is, a length of the subframe is 1 millisecond.

A subframe includes 14 OFDM symbols in this example. A subframe includes two slots. That is, each slot includes seven OFDM symbols. A subframe can transport signals by using a plurality of subcarriers having different frequencies. Subcarriers are arranged at for example 15 kHz spacing.

Figure 3:
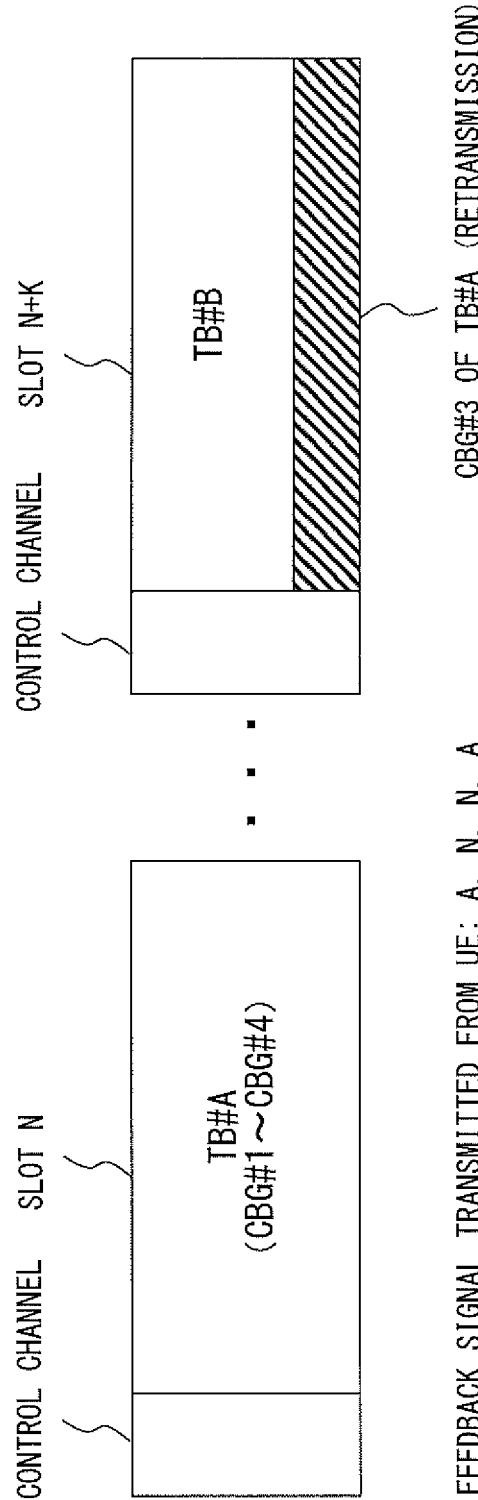
FIG. 3 illustrates an example of a transmission and a retransmission of a code block group.

FIG. 3 illustrates an example of a transmission and a retransmission of code block group CBG. One transport block TB is transported in one slot in this example. Transport block TB stores four code block groups CBG: code block groups CBG #1 through CBG #4. A control channel for transmitting control information is allocated at the start of each slot.

Transport block TBA is transported to the user equipment 2 from the base station 1 in slot N. It is assumed that the user equipment 2 has failed to receive code block groups CBG #2 and CBG #3 successfully. In this case, the user equipment 2 transmits the feedback signal "A, N, N, A" to the base station 1.

The base station 1 performs a retransmission process based on the feedback signal. However, a decode error may occur for a feedback signal in the base station 1. In the example illustrated in FIG. 3, a decode error has occurred in the second bit of the feedback signal. In such a case, the base station 1 mistakenly recognizes that code block group CBG #2 has been successfully received by the user equipment 2 despite that code block group CBG #2 has not been successfully received by the user equipment 2. Then, the base station 1 retransmits only code block group CBG #3 to the user equipment 2. In other words, code block group CBG #2 is not retransmitted. Note that code block group CBG #3 is retransmitted to the user equipment 2 through for example a specified subchannel in slot N+k.

In such a case, the user equipment 2 uses a layer (an RLC layer for example) higher than the MAC layer, in which HARQ is implemented, so as to make a request for the base station 1 to retransmit code block group CBG #2. Accordingly, it takes longer time to receive the transport block TB than the retransmission according to HARQ. This problem is serious particularly when the size of transport block TB is large.

Also, in LTE, an ACK/NACK bit is transmitted for each subframe. By contrast, an ACK/NACK bit is transmitted for each code block group CBG in the example illustrated in FIG. 1. Therefore, decode errors occur for feedback signals with a higher probability. Accordingly, it is desirable that a wireless communication system in which an ACK/NACK bit is transmitted for each code block group CBG be provided with a function of suppressing the influence of a decode error.

First Embodiment

Figure 4:
FIG. 4 illustrates an example of downlink control information.

To address the above problem, a CBG indicator (a code block group indicator or a CBG-I) is transmitted from the base station 1 to the user equipment 2. A CBG indicator is inserted into downlink control information (DCI) and transmitted from the base station 1 to the user equipment 2. Downlink control information controls a downlink that transports a signal from the base station 1 to the user equipment 2. Accordingly, downlink control information contains MCS information, redundancy version (RV) information, etc. as illustrated in FIG. 4. The MCS information specifies a modulation scheme, a coding scheme, etc. Note that downlink control information DCI is allocated in the control channel region of each slot in the example illustrated in FIG. 3.

FIG. 5A illustrates an example of a CBG indicator (CBG-I). A CBG-I indicates a feedback signal decoded in the base station 1. Thus, each bit in a CBG-I indicates whether the corresponding code block group CBG has been successfully received in the user equipment 2. For example, the first bit in a CBG-I indicates whether code block group CBG #1 has been successfully received in the user equipment 2 and the second bit of the CBG-I indicates whether code block group CBG #2 has been successfully received in the user equipment 2. However, a decode error may occur when a feedback signal is received in the base station 1 as described above. Also, in a bit in which a decode error has occurred, the value of the CBG-I is different from the corresponding value in the feedback signal transmitted from the user equipment 2.

When a CBG-I (i.e., the feedback signal decoded in the base station 1) is "0000", the base station 1 determines that code block groups CBG #1 through CBG #4 have all been successfully received in the user equipment 2. In that case, the base station 1 transmits new transport block TB to the user equipment 2 without retransmitting a code block group CBG.

When a CBG-I is "0001" through "1110", the base station 1 determines that code block groups CBG corresponding to the bits in which "1" is set (i.e., the code block groups CBG specified by the CBG-I) have not been successfully received in the user equipment 2. In that case, the base station 1 retransmits code block group CBG specified by the CBG-I to the user equipment 2. For example, when the CBG-I is "0001", the base station 1 retransmits code block group CBG #4 to the user equipment 2. Alternatively, when the CBG-I is "1110", the base station 1 retransmits code block groups CBG #1, CBG #2, and CBG #3 to the user equipment 2.

When the CBG-I is "1111", the base station 1 determines that code block groups CBG #1 through CBG #4 have all failed to be received successfully in the user equipment 2. In that case, the base station 1 retransmits transport block TB to the user equipment 2.

According to the CBG-I received from the base station 1, the user equipment 2 determines whether the feedback signal has been successfully decoded in the base station 1. In other words, the user equipment 2 determines whether there is a decode error of a feedback signal in the base station 1 according to a CBG-I received from the base station 1. For the determination, the user equipment 2 compares the feedback signal transmitted to the base station 1 and the CBG-I received from the base station 1. When the feedback signal and the CBG-I match in every bit, the user equipment 2 determines that there is no decode error. When there are bits that do not match each other between the feedback signal and the CBG-I, the user equipment 2 determines that a decode error has occurred in the base station 1.

FIG. 5B illustrates another example of a CBG indicator (CBG-I). FIG. 5B illustrates an example of a case in which the number of bits representing a CBG-I is smaller than the number of groups of CBG. Note, similarly to the example of FIG. 5A, that each bit in the CBG-I indicates that the corresponding code block group CBG has been successfully received in the user equipment 2. However, the number of bits in the CBG-I and the number of groups of CBG are different. Thus, the retransmission is expressed by the CBG-I while taking into consideration, for example, a probability of a combination that causes a retransmission and other factors.

When the CBG-I is "000", the base station 1 determines that code block groups CBG #1 through CBG #4 have all been successfully received in the user equipment 2. In such a case, the base station 1 transmits new transport block TB to the user equipment 2 without retransmitting code block group CBG.

When the CBG-I is "001" through "110", the base station 1 determines that code block groups CBG (i.e., the code block groups CBG specified by the CBG-I) have not been successfully received in the user equipment 2. In that case, the base station 1 retransmits code block groups CBG specified by the CBG-I to the user equipment 2. For example, when the CBG-I is "001", the base station 1 retransmits code block group CBG #1 to the user equipment 2. When the CBG-I is "010", the base station 1 retransmits code block group CBG #2 to the user equipment 2. When the CBG-I is "011", the base station 1 retransmits code block group CBG #3 to the user equipment 2. When the CBG-I is "100", the base station 1 retransmits code block group CBG

4 to the user equipment 2. When the CBG-I is "101", the base station 1 retransmits code block groups CBG #1, CBG #2, and CBG #3 to the user equipment 2. When the CBG-I is "110", the base station 1 retransmits code block groups CBG #2, CBG #3, and CBG #4 to the user equipment 2.

When the CBG-I is "111", the base station 1 determines that code block groups CBG #1 through CBG #4 have all failed to be successfully received in the user equipment 2. In such a case, the base station 1 retransmits transport block TB to the user equipment 2.

Note that a CBG-I including a combination corresponding to one of the above combinations is transmitted in cases other than the above cases. For example, when the base station 1 determines that code block groups CBG #1 and CBG #2 are to be retransmitted, the base station 1 generates a CBG-I "101" and transmits it to the user equipment 2. Note that CBG-I "101" indicates a retransmission of code block groups CBG #1, CBG #2 and CBG #3. That is, CBG-I "101" indicates a retransmission of a plurality of code block groups including the specified code block groups CBG #1 and CBG #2. In that case, the base station 1 retransmits code block groups CBG #1, CBG #2, and CBG #3 to the user equipment 2.

The bit expression illustrated in FIG. 5B is an example, and a different bit expression may be employed while taking, into consideration, the number of bits in the CBG-I, the number of the code block groups CBG in a transport block TB, etc. Also, it is desirable that a combination having a high probability of causing retransmission be taken into consideration for a bit expression of a CBG-I.

Figure 6:
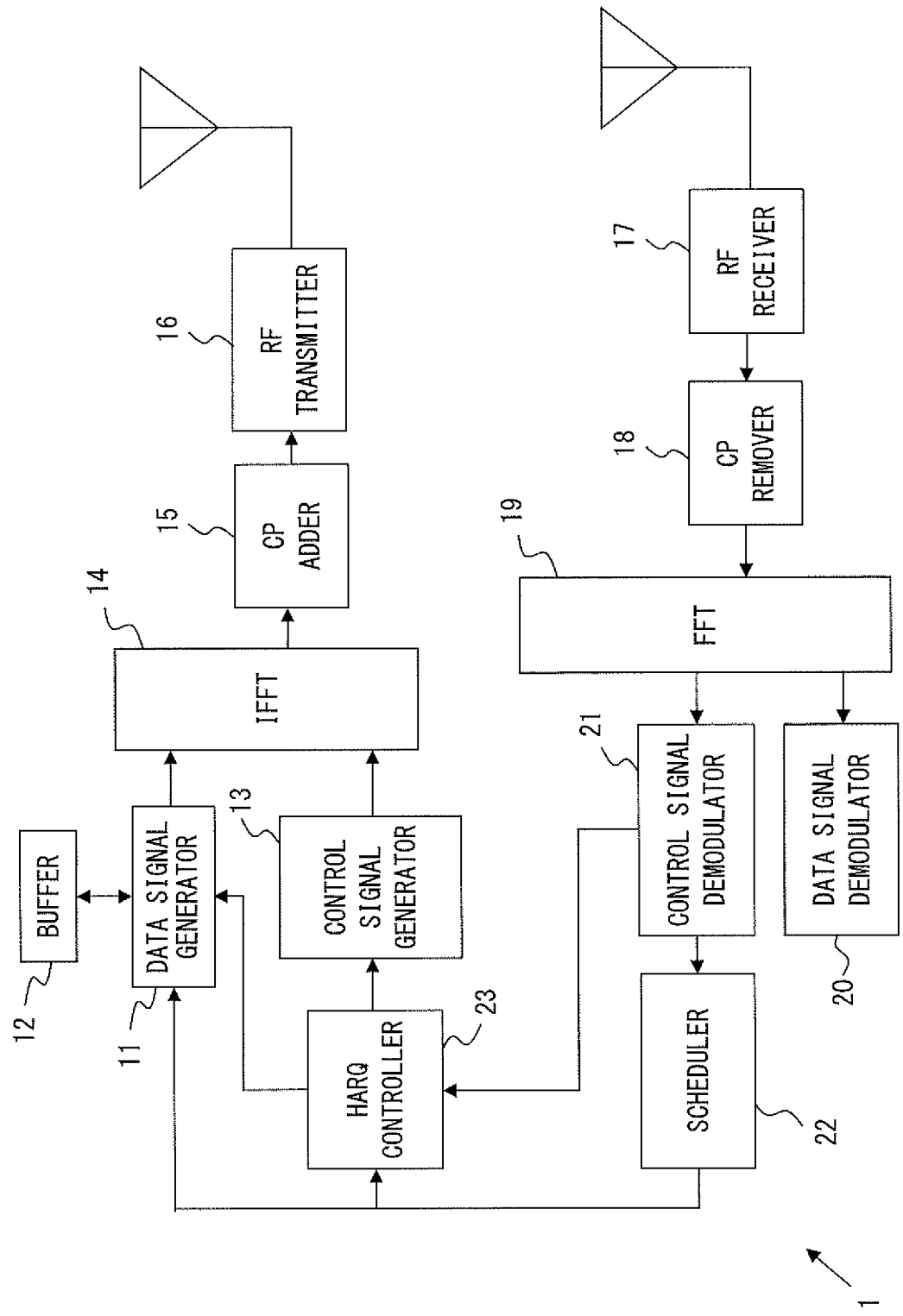
FIG. 6 is a block diagram illustrating an example of the functions of a base station.

FIG. 6 is a block diagram illustrating an example of the functions of the base station 1. The base station 1 includes a data signal generator 11, a buffer 12, a control signal generator 13, an IFFT circuit 14, a CP adder 15, an RF transmitter 16, an RF receiver 17, a CP remover 18, an FFT circuit 19, a data signal demodulator 20, a control signal demodulator 21, a scheduler 22, and an HARQ controller 23.

The data signal generator 11 generates a data signal that is to be transmitted to the user equipment 2. The data signal generator 11 generates the data signal according to schedule information generated by the scheduler 22. Note that a data signal generated by the data signal generator 11 is temporarily stored in the buffer 12. Also, the data signal generator 11 can retransmit a data signal stored in the buffer 12 to the user equipment 2 in response to an instruction from the HARQ controller 23. The control signal generator 13 generates a control signal that is to be transmitted to the user equipment 2. The control signal generator 13 generates the control signal according to schedule information generated by the scheduler 22. Downlink control information DCI is generated by the control signal generator 13.

The IFFT circuit 14 generates a time domain signal from a data signal generated by the data signal generator 11 and a control signal generated by the control signal generator 13 through an IFFT operation. The CP adder 15 adds a cyclic prefix (CP) to the time domain signal output from the IFFT circuit 14. The cyclic prefix is inserted into an OFDM signal in order to suppress multipath fading. The RF transmitter 16 generates an RF-modulated signal from the time domain signal to which the cycle prefix has been added, and outputs that RF-modulated signal via an antenna. Note that the RF transmitter 16 may be provided with a frequency converter that up-converts a transmission signal into the RF band.

The RF receiver 17 receives a radio signal transmitted from the user equipment 2. Note that the RF receiver 17 may be provided with a frequency converter that down-converts a received RF-band signal. The CP remover 18 removes the cyclic prefix from the received signal. The FFT circuit 19 converts the received signal from which the cyclic prefix has been removed into a frequency domain signal through an FFT operation. In other words, the received signal is separated for each subcarrier.

The data signal demodulator 20 demodulates and decodes the data signal included in the received signal. In other words, the data transmitted from the user equipment 2 is recovered. The control signal demodulator 21 demodulates and decodes the control signal included in the received signal. In other words, the control information transmitted from the user equipment 2 is recovered. The feedback signal (ACK/NACK bits) transmitted from the user equipment 2 is recovered by the control signal demodulator 21.

Based on the control information received from the user equipment 2, the scheduler 22 determines the allocation of a specified radio resource prepared for a communication between the base station 1 and the user equipment 2. The radio resource includes a frequency resource and a time resource as illustrated in FIG. 2. In other words, the scheduler 22 can allocate a subcarrier and a symbol to a transmission signal (data signal and control signal). The scheduler 22 generates schedule information that indicates the allocation of a radio resource.

The HARQ controller 23 performs a retransmission control based on the feedback signal recovered by the control signal demodulator 21. Specifically, when a code block group CBG that has not been successfully received in the user equipment 2 is detected, the HARQ controller 23 supplies, to the data signal generator 11, an instruction to retransmit that code block group CBG. Also, the HARQ controller 23 generates the CBG-I based on the feedback signal recovered by the control signal demodulator 21. The CBG-I is inserted by the control signal generator 13 into the downlink control information DCI, and is transmitted to the user equipment 2.

Part or all of the data signal generator 11, the control signal generator 13, the IFFT circuit 14, the FFT circuit 19, the data signal demodulator 20, the control signal demodulator 21, the scheduler 22, and the HARQ controller 23 may be implemented by for example a processor system that includes a processor element and a memory. Alternatively, part or all of the data signal generator 11, the control signal generator 13, the IFFT circuit 14, the FFT circuit 19, the data signal demodulator 20, the control signal demodulator 21, the scheduler 22, and the HARQ controller 23 may be implemented by a digital signal processing circuit.

Figure 7:
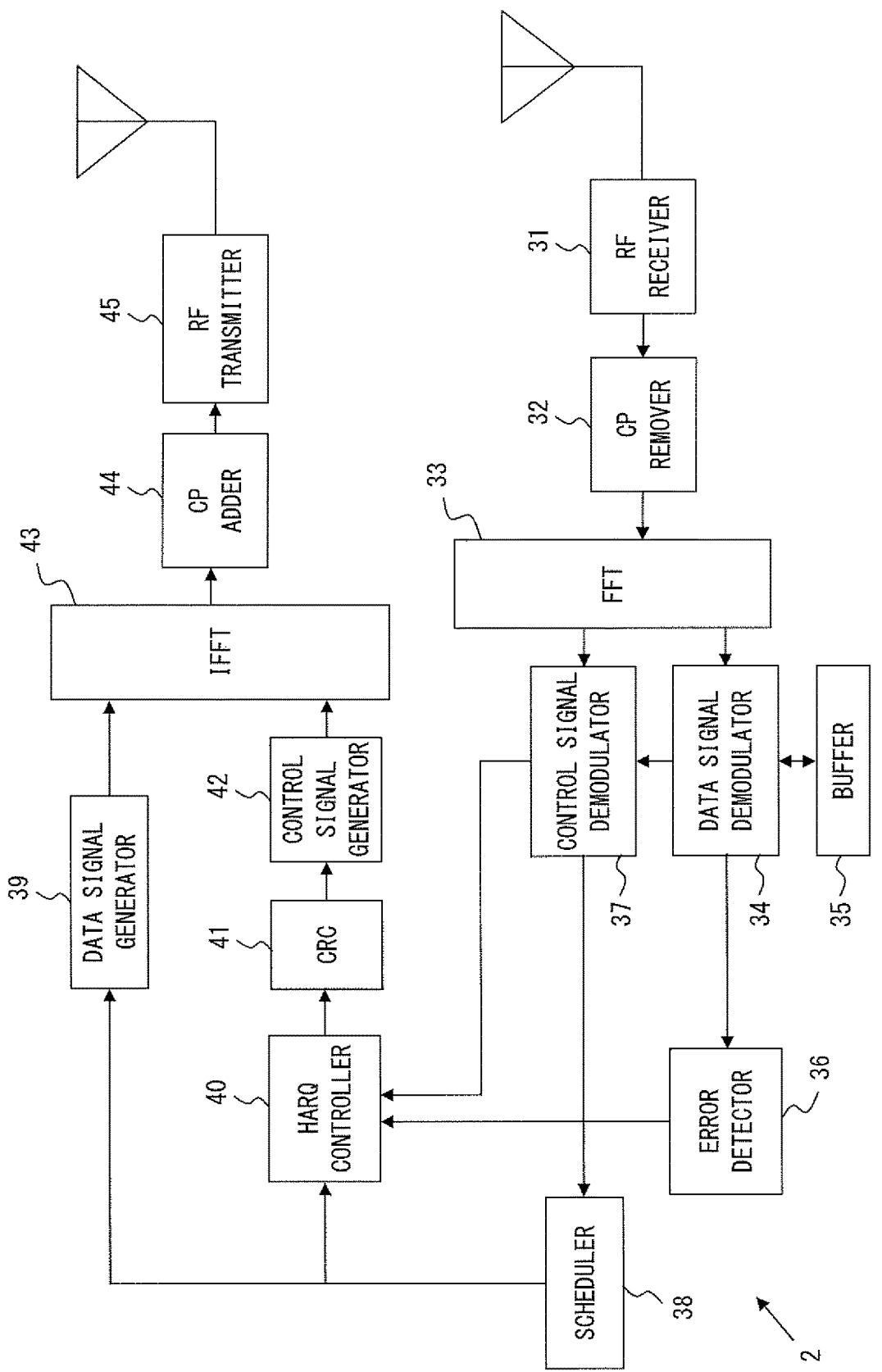
FIG. 7 is a block diagram illustrating an example of the functions of a user equipment.

FIG. 7 is a block diagram illustrating an example of the functions of the user equipment 2. The user equipment 2 includes an RF receiver 31, a CP remover 32, an FFT circuit 33, a data signal demodulator 34, a buffer 35, an error detector 36, a control signal demodulator 37, a scheduler 38, a data signal generator 39, an HARQ controller 40, a CRC adder 41, a control signal generator 42, an IFFT circuit 43, a CP adder 44, and an RF transmitter 45.

The RF receiver 31 receives a radio signal transmitted from the base station 1. Note that the RF receiver 31 may be provided with a frequency converter that down-converts a received signal into the RF band. The CP remover 32 removes the cyclic prefix from the received signal. The FFT circuit 33 converts the received signal from which the cyclic prefix has been removed into a frequency domain signal through an FFT operation. In other words, the received signal is separated for each subcarrier.

The data signal demodulator 34 demodulates and decodes the data signal included in the received signal. In other words, the data transmitted from the base station 1 is recovered. The buffer 35 temporarily stores the data signal included in the received signal. Note that the data signal demodulator 34 may recover data from the data signal stored in the buffer 35 and the data signal retransmitted from the base station 1. In such a case, for example soft combining is performed. The error detector 36 uses the CRC to detect an error in the data recovered by the data signal demodulator 34. The error detector 36 may detect an error for each code block CB.

The control signal demodulator 37 demodulates and decodes the control signal included in the received signal. In other words, the control information transmitted from the base station 1 is recovered. The downlink control information DCI transmitted from the base station 1 is recovered by the control signal demodulator 37. When downlink control information DCI contains a CBG-I, the CBG-I is also recovered by the control signal demodulator 37.

Based on the control information received from the base station 1, the scheduler 38 determines the allocation of a specified radio resource prepared for a communication between the base station 1 and the user equipment 2. The scheduler 38 then generates schedule information, which represents the allocation of a radio resource.

The data signal generator 39 generates a data signal that is to be transmitted to the base station 1. Specifically, the data signal generator 39 may generate the data signal according to schedule information generated by the scheduler 38.

The HARQ controller 40 generates a feedback signal based on a detection result obtained from the error detector 36. As described above, a feedback signal indicates whether data of each code block group CBG has been successfully received by the user equipment 2. Also, the HARQ controller 40 compares the generated feedback signal and a CBG-I received from the base station 1, and thereby decides whether the feedback signal has been successfully decoded in the base station 1. That is to say, the HARQ controller 40 can detect a decode error of a feedback signal in the base station 1. Note that when a decode error of a feedback signal has been detected, the user equipment 2 may transmit a correct feedback signal (or retransmit the feedback signal) to the base station 1. The CRC adder 41 adds a CRC to a feedback signal as needed.

The control signal generator 42 generates a control signal that is to be transmitted to the base station 1. Specifically, the control signal generator 42 may generate the control signal according to schedule information generated by the scheduler 38.

The IFFT circuit 43 generates a time domain signal from a data signal generated by the data signal generator 39 and a control signal generated by the control signal generator 42 through an IFFT operation. The CP adder 44 adds a cyclic prefix to the time domain signal output from the IFFT circuit 43. The RF transmitter 45 generates an RF-modulated signal from the time domain signal to which the cycle prefix has been added, and outputs that RF-modulated signal via an antenna. Note that the RF transmitter 45 may be provided with a frequency converter that up-converts a transmission signal into the RF band.

Part of all of the FFT circuit 33, the data signal demodulator 34, the error detector 36, the control signal demodulator 37, the scheduler 38, the data signal generator 39, the HARQ controller 40, the CRC adder 41, the control signal generator 42, and the IFFT circuit 43 are implemented by for example a processor system that includes a processor element and a memory. Alternatively, part or all of the FFT circuit 33, the data signal demodulator 34, the error detector 36, the control signal demodulator 37, the scheduler 38, the data signal generator 39, the HARQ controller 40, the CRC adder 41, the control signal generator 42, and the IFFT circuit 43 may be implemented by a digital signal processing circuit.

FIG. 8 is a flowchart illustrating an example of a process performed by the user equipment 2. Note that this flowchart illustrates a process related to hybrid automatic repeat request for downlink.

In S1, the user equipment 2 receives transport block TB from the base station 1. Transport block TB stores a plurality of code block groups CBG. In S2, the error detector 36 detects an error in each code block group CBG. In other words, the error detector 36 determines whether each code block group CBG has been successfully received.

In S3, the HARQ controller 40 generates a feedback signal based on the detection result by the error detector 36. In this example, one bit is allocated to each code block group CBG. For the allocation, a bit corresponding to a code block group CBG in which an error has been detected is set to "1 (NACK)", and a bit corresponding to a code block group CBG in which no error has been detected is set to "0 (ACK)". Then, the user equipment 2 transmits the generated feedback signal to the base station 1.

When receiving the feedback signal, the base station 1 generates a corresponding CBG-I and transmits the CBG-I to the user equipment 2. Accordingly, in S4, the user equipment 2 receives the CBG-I corresponding to the feedback signal transmitted in S3. The CBG-I is generated by decoding a feedback signal in the base station 1 in this example. Thus, the feedback signal and the CBG-I are identical to each other when there is no decode error for the feedback signal. Note that the base station 1 retransmits one or a plurality of code block groups CBG to the user equipment 2 as needed. Accordingly, when the base station 1 retransmits code block group CBG, the user equipment 2 receives the CBG-I and the retransmitted code block group CBG in S4.

In S5 through S7, the HARQ controller 40 compares the feedback signal and the CBG-I. When all the bits are "zero" in the feedback signal, it means a state in which no error has been detected in S2. In such a case, the user equipment 2 does not need retransmission data. Also, when the feedback signal and the CBG-I are identical to each other, it means a state in which a decode error of the feedback signal has not occurred in the base station 1. Accordingly, when all the bits of the feedback signal and the CBG-I are "zero" (YES in S5), the retransmission control is not performed, and the process by the user equipment 2 returns to S1.

When all the bits are "zero" in the feedback signal and the CBG-I includes "1" (YES in S6), the HARQ controller 40 determines that a decode error of the feedback signal has occurred in the base station 1. In such a case, in S8, the HARQ controller 40 transmits the previously transmitted feedback signal again to the base station 1. However, because all the bits are "zero" in the feedback signal, the user equipment 2 does not need the retransmission data in this case. Thus, even when receiving the retransmission data from the base station 1, the user equipment 2 ignores that retransmission data. Thereafter, the process by the user equipment 2 returns to S4.

When all the bits are "zero" in the CBG-I and the feedback signal includes "1" (YES in S7), the HARQ controller 40 determines that a decode error of the feedback signal has occurred in the base station 1. In such case as well, in S8, the HARQ controller 40 transmits the previously transmitted feedback signal again to the base station 1.

However, because the feedback signal includes "1", the user equipment 2 needs the retransmission data in this case. Accordingly, by transmitting the feedback signal that includes "1" to the base station 1 again, the user equipment 2 can request the base station 1 to retransmit necessary data. Thereafter, the process by the user equipment 2 returns to S4.

When the feedback signal includes "1" and the CBG-I also includes "1" (NO in S7), the user equipment 2 needs the retransmission data and the base station 1 retransmits the code block group. Thus, the user equipment 2 performs a reception process for the retransmission data in S9. For this process, the user equipment 2 may recover data from the data signal stored in the buffer 35 and the data signal retransmitted from the base station 1. Alternatively, the user equipment 2 may recover the data from the data signal retransmitted from the base station 1, without using a data signal stored in the buffer 35.

Figure 9:
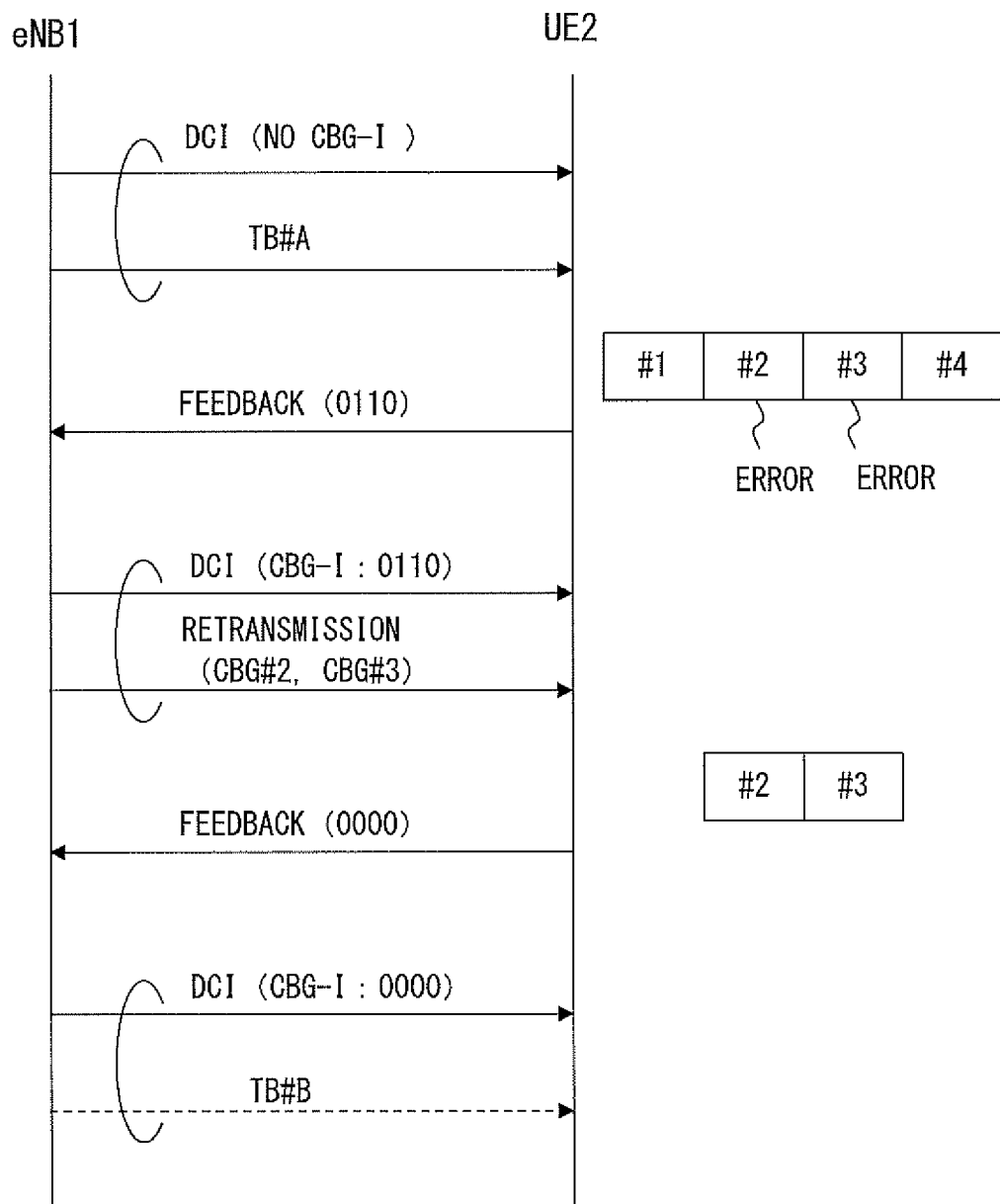
FIG. 9 illustrates an example of a sequence of HARQ.

FIG. 9 and FIG. 10 illustrate examples of sequences of a hybrid automatic repeat request. Note that transport block TB stores four code block groups CBG: code block groups CBG #1 through CBG #4 in this example.

In the case illustrated in FIG. 9, downlink control information DCI and transport block TB #A is transmitted from the base station (eNB) 1 to the user equipment (UE) 2. Then, the user equipment 2 receives transport block TB #A by using downlink control information DCI. It is assumed, in this situation, that code block groups CBG #1 and CBG #4 have been successfully received but code block groups CBG #2 and CBG #3 have not been successfully received. In such a case, the user equipment 2 transmits a feedback signal "0110" to the base station 1.

The base station 1 decodes the feedback signal received from the user equipment 2. It is assumed in this example that the feedback signal is successfully decoded. In such a case, the base station 1 recognizes that code block groups CBG #2 and CBG #3 have not been successfully received in the user equipment 2. Then, the base station 1 generates a CBG-I "0110" and transmits the CBG-I to the user equipment 2. Note that a CBG-I is inserted in downlink control information DCI. Also, the base station 1 retransmits code block groups CBG #2 and CBG #3 to the user equipment 2.

The user equipment 2 receives code block groups CBG #2 and CBG #3 retransmitted from the base station 1. It is assumed that code block groups CBG #2 and CBG #3 have been successfully received in this situation. Then, the user equipment 2 transmits a feedback signal "0000" to the base station 1.

The base station 1 decodes the feedback signal received from the user equipment 2. As a result, the base station 1 recognizes that code block groups CBG #1 through CBG #4 have all been successfully received by the user equipment 2. Then, the base station 1 generates a CBG-I "0000" and transmits the CBG-I to the user equipment 2. At this time, the base station 1 may transmit next transport block TB to the user equipment 2.

As described above, the user equipment 2 may use a feedback signal so as to request the base station 1 to retransmit necessary data. Note that when the CBG-I includes "1", the base station 1 retransmits the corresponding data to the user equipment 2. When, by contrast, all the bits are "zero" in the CBG-I, the base station 1 transmits new data to the user equipment 2 without performing retransmission. This means that a CBG-I can also be used as an indicator to specify whether to transmit new data. In other words, a CBG-I can also be used as a new data indicator (NDI) for transport block TB.

Similarly to the case of FIG. 9, a feedback signal "0110" is transmitted from the user equipment 2 to the base station 1 in the case of FIG. 10. However, a decode error of the feedback signal occurs in the base station 1. The decode error occurred in the third bit of the feedback signal and thus the decoded feedback signal is "0100" in this example. In this case, the base station 1 recognizes that only code block group CBG #2 has failed to be successfully received in the user equipment 2. Therefore, the base station 1 generates a CBG-I "0100" and transmits the CBG-I to the user equipment 2. Also, the base station 1 retransmits only code block group CBG #2 to the user equipment 2.

The user equipment 2 compares the feedback signal that was previously transmitted to the base station 1 and the CBG-I received from the base station 1. In this example, because the feedback signal and the CBG-I do not match each other, the user equipment 2 recognizes that a decode error of the feedback signal has occurred in the base station 1. Also, the user equipment 2 receives code block group CBG #2 retransmitted from the base station 1. It is assumed that code block group CBG #2 has been successfully received in this situation. Note that the user equipment 2 may transmit HARQ feedback signal for all the code block groups CBG every time a retransmission is performed.

Then, the user equipment 2 generates a new feedback signal. In this example, because code block group CBG #2 has been successfully received, "zero (ACK)" is set in the second bit of the feedback signal. Meanwhile, because code block group CBG #3 has not been retransmitted, the user equipment 2 makes a request to the base station 1 for code block group CBG #3. Accordingly, "1 (NACK)" is set in the third bit of the feedback signal.

When receiving this feedback signal, the base station 1 retransmits code block group CBG #3 to the user equipment 2. As a result, the user equipment 2 can recover data from all of code block groups CBG #1 through CBG #4.

Figure 11:
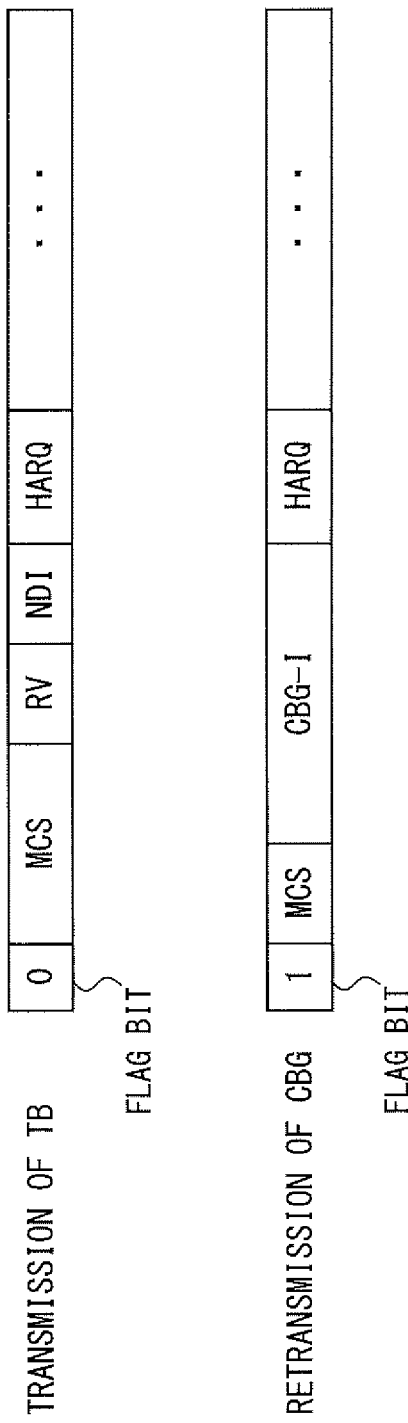
FIG. 11 illustrates a confirmation example of downlink control information.

FIG. 11 illustrates a confirmation example of downlink control information DCI. In this example, downlink control information DCI includes a flag bit. The flag bit identifies the transmission of transport block TB or the retransmission of code block group CBG.

When transport block TB is transmitted, the downlink control information DCI contains MCS information, RV information, NDI information, HARQ information, etc. The MCS information indicates the size of transport block TB (TBS), the modulation scheme, etc. The RV information indicates the redundancy version of the HARQ. The NDI information indicates whether the data stored in the slot is new data.

When code block group CBG is retransmitted, the TBS is identical to the size of transport block TB that was previously transmitted. Also, data can be transmitted through the same modulation scheme in both the initial transmission of transport block TB and the retransmission of code block group CBG. Accordingly, the retransmission of code block group CBG needs fewer bits for the MCS information than in the transmission of transport block TB.

Also, the same redundancy version can be used both in the initial transmission of transport block TB and the retransmission of code block group CBG. Accordingly, when code block group CBG is retransmitted, the RV information may be omitted.

Further, as described above, a CBG-I can indicate whether the data in the slot is new data. Specifically, when all the bits are "zero" in a CBG-I, it represents the initial transmission of the new data. Accordingly, when code block group CBG is retransmitted, NDI information may be omitted.

As described above, the number of bits for some information areas can be reduced for the retransmission of code block group CBG in comparison with the transmission of transport block TB. A CBG-I is transported by using thus omitted bits. Accordingly, a CBG-I can be transmitted without increasing the number of bits for downlink control information DCI. In other words, the numbers of bits of downlink control information DCI (the lengths of downlink control information DCI) can be the same between the transmission of transport block TB and the retransmission of code block group CBG.

Note that when receiving retransmitted code block group CBG, the user equipment 2 may use a data signal stored in the buffer 35 according to an application or a use case. For example, when transport block TB transports only eMBB data, it is desirable that a data signal stored in the buffer 35 and the retransmitted data signal be soft-combined so as to recover the data. Alternatively, when eMBB data and URLLC data are multiplexed in a slot, it is desirable that the data be recovered from the retransmitted data signal without using a data signal stored in the buffer 35. Therefore, the base station 1 may transmit, to the user equipment 2, buffer information that indicates whether to use a data signal stored in the buffer 35, in addition to a CBG-I.

FIG. 12 illustrates an example of a hybrid automatic repeat request that uses buffer information. According to this method, the base station 1 can specify whether the user equipment 2 is to use a data signal stored in the buffer 35 so as to recover the data. For example, when the CBG-I is "0001 ("1" in FIG. 12)" and the buffer information is "0", the base station 1 retransmits code block group CBG #4. At this time, the user equipment 2 recovers data from the data signal of code block group CBG #4 stored in the buffer 35 and retransmitted code block group CBG #4. When the CBG-I is "0001 ("1" in FIG. 12)" and the buffer information is "1", the user equipment 2 deletes the data signal of code block group CBG #4 from the buffer 35 and recovers the data from the retransmitted code block group CBG #4.

In the above example, the base station 1 decodes a feedback signal received from the user equipment 2 so as to generate a CBG-I. The CBG-I is thereafter used as a control signal for detecting a decode error of the feedback signal in the user equipment 2. However, control signals for detecting a decode error of a feedback signal are not limited to above CBG-I.

FIG. 13 illustrates another example of a control signal for detecting a decode error of a feedback signal. In this example, a CBG-new data indicator (CBG-NDI) instead of a CBG-I is reported from the base station 1 to the user equipment 2. The CBG-NDI is generated by inverting the logic of each bit of the feedback signal decoded in the base station 1. Thus, each bit of the CBG-NDI indicates whether the corresponding code block group CBG is new data. Specifically, "1" represents a state in which new data is transmitted through the corresponding code block group CBG, and "zero" represents a state in which the data of the corresponding code block group CBG is retransmitted. Then, the base station 1 performs the transmission/retransmission of code block group CBG according to the CBG-NDI.

The user equipment 2 can detect a decode error of a feedback signal in the base station 1 based on the feedback signal and the CBG-NDI. The CBG-NDI is generated by inverting the logic of each bit of the feedback signal decoded in the base station 1. Accordingly, the user equipment 2 can detect a decode error of a feedback signal by comparing the feedback signal and a signal resulting from inverting the logic of each bit of the CBG-NDI.

As described above, the user equipment 2 can detect a decode error of a feedback signal in the base station 1 according to the method illustrated in FIG. 13 as well. Also, when all the bits are "1" in the CBG-NDI, the base station 1 transmits new transport block TB. Accordingly, a CBG-NDI may also be used as information indicating whether transport block TB contains new data.

Second Embodiment

In the second embodiment, an error detection code or an error correction code is added to each bit of a feedback signal transmitted from the user equipment 2 to the base station 1. For example, a CRC is added to each bit of the feedback signal.

Figure 14:
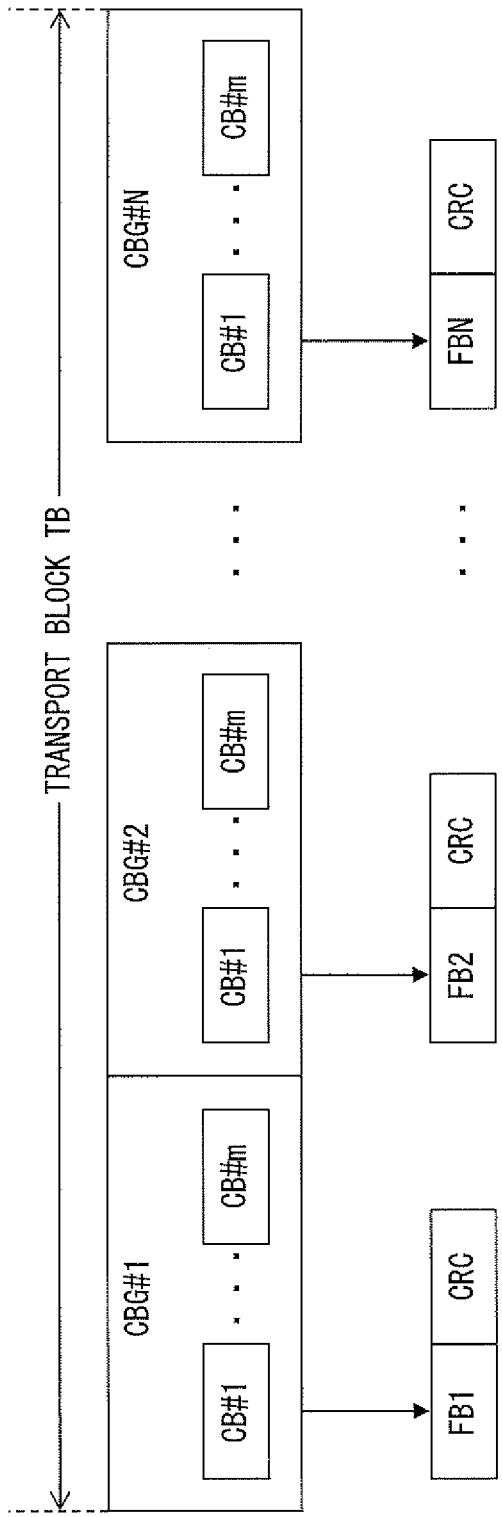
FIG. 14 illustrates an example of an HARQ according to the second embodiment.

Transport block TB stores a plurality of code block groups CBG: code block groups CBG #1 through CBG #N in the example illustrated in FIG. 14. Each code block group CBG includes m code blocks CB. In this case, when receiving transport block TB, the user equipment 2 generates feedback signals FB1 through FBN, which respectively correspond to code block groups CBG #1 through CBG #N. Feedback signals FB1 through FBN respectively indicate whether code block groups CBG #1 through CBG #N have been successfully received by the user equipment 2.

The user equipment 2 adds CRCs respectively to bits FB1 through FBN of the feedback signal as illustrated in FIG. 13. Note that the CRCs are added to the bits of the feedback signal by the CRC adder 41 illustrated in FIG. 7. The user equipment 2 then transmits, to the base station 1, the feedback signal to which the CRCs have been added. Therefore, the base station 1 can detect a decode error by using the CRC when decoding the feedback signal.

In the second embodiment, a CRC is added to each ACK/NACK bit transmitted from the user equipment 2 to the base station 1 as described above. Therefore, the base station 1 can surely detect code block group CBG requested by the user equipment 2, and thereby the number of retransmissions can be reduced.

Third Embodiment

In the third embodiment, the user equipment 2 transmits, to the base station 1, information indicating whether transport block TB has been successfully received in addition to the information indicating whether each code block group CBG has been successfully received. Specifically, a feedback signal includes an ACK/NACK bit for each code block group CBG and an ACK/NACK bit for transport block TB.

Figure 15:
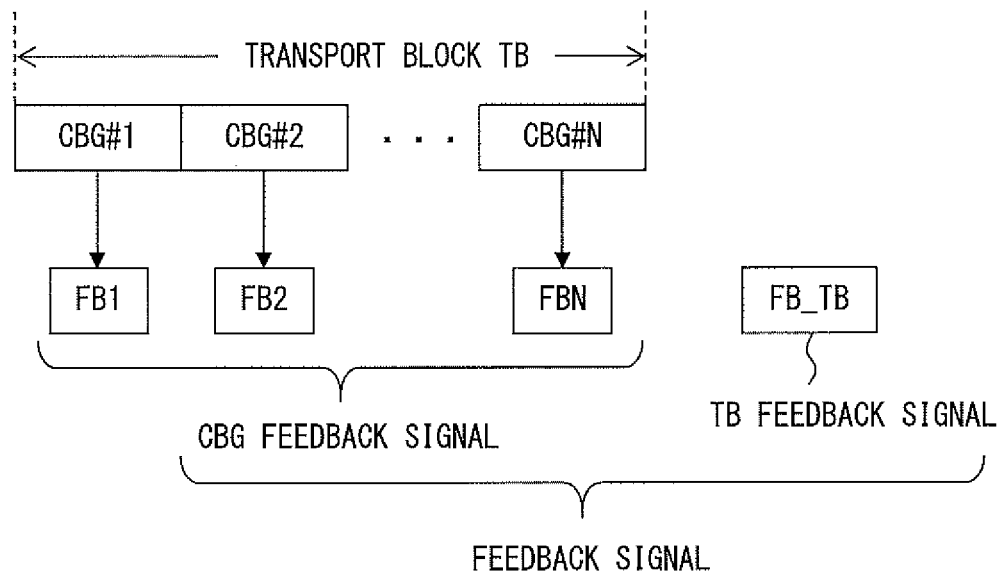
FIG. 15 illustrates an example of an HARQ according to the third embodiment.

In the example illustrated in FIG. 15, transport block TB stores a plurality of code block groups: code block groups CBG #1 through CBG #N. In this case, when receiving transport block TB, the user equipment 2 generates CBG feedback signals FB1 through FBN, which respectively correspond to code block groups CBG #1 through CBG #N. CBG feedback signals FB1 through FBN respectively indicate whether code block groups CBG #1 through CBG #N have been successfully received by the user equipment 2. In addition to these signals, the user equipment 2 generates TB feedback signal FB_TB, which corresponds to transport block TB. TB feedback signal FB_TB indicates whether transport block TB has been successfully received by the user equipment 2. The user equipment 2 then transmits CBG feedback signals FB1 through FBN and TB feedback signal FB_TB to the base station 1.

Note that when code block groups CBG #1 through CBG #N have all been successfully received, CBG feedback signals FB1 through FBN are all "zero (ACK)" and TB feedback signal FB_TB is also "zero (ACK)". When at least one of code block groups CBG #1 through CBG #N has not been successfully received, TB feedback signal FB_TB is "1 (NACK)".

The base station 1 decodes CBG feedback signals FB1 through FBN and TB feedback signal FB_TB received from the user equipment 2. Then, the base station 1 detects a decode error based on a conformity among the decoding results.

For example, when code block group CBG #2 has not been successfully received in the user equipment 2, a CBG feedback signal "0100" and a TB feedback signal "1" are reported to the base station 1. In other words, the user equipment 2 requests the base station 1 to retransmit code block group CBG #2. It is assumed in this situation that the decoding results by the base station 1 are as below:
CBG feedback signal: 0100
TB feedback signal: 0

In such a case, the base station 1 determines that a decode error has occurred in the second bit of the CBG feedback signal or in the TB feedback signal. Then, the base station 1 retransmits transport block TB to the user equipment 2.

Alternatively, it is assumed that the decoding results by the base station 1 are as below:
CBG feedback signal: 0000
TB feedback signal: 1

In such a case, the base station 1 determines that a decode error has occurred in one of the bits of the CBG feedback signal or in the TB feedback signal. Then, the base station 1 retransmits transport block TB to the user equipment 2.

As described above, in the third embodiment, a decode error of a feedback signal is detected in the base station 1. When detecting a decode error of a feedback signal, the base station 1 retransmits necessary data to the user equipment 2. Therefore, the number of transmissions of signals related to data retransmissions may be reduced between the base station 1 and the user equipment 2 according to the third embodiment.

Fourth Embodiment

The number of code blocks CB stored in transport block TB is sometimes smaller than the number of code block groups. Specifically, when the number of code block groups CBG stored in transport block TB is M, the number of code blocks CB stored in transport block TB is sometimes N (N<M), depending on an application or a use case.

In such a case, the granularity of code block groups CBG is made finer in the fourth embodiment. For example, a data structure is defined in such a manner that one code block CB is stored in one code block group CBG.

Figure 16A:
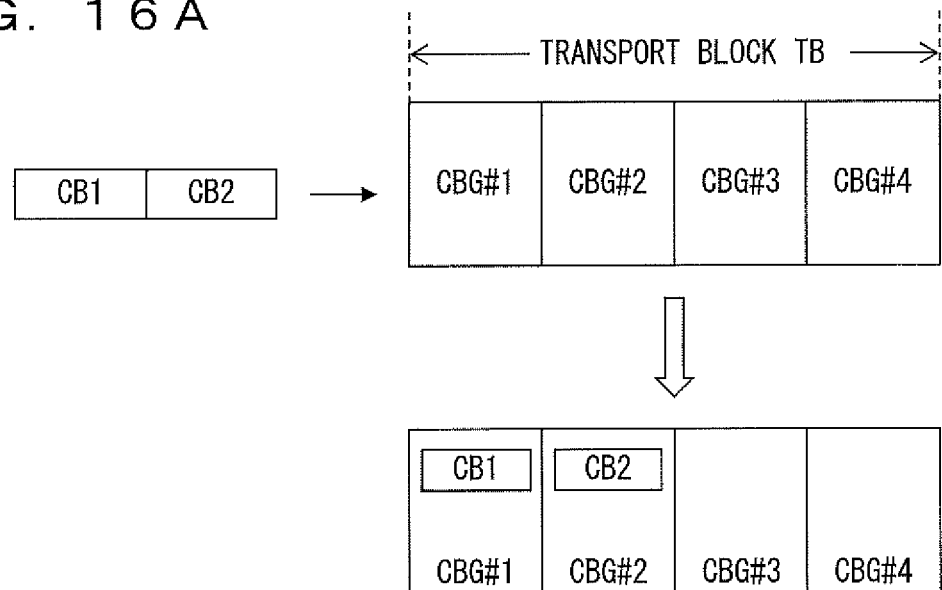
FIGS. 16A, 16B and 16C illustrate an example of an HARQ according to the fourth embodiment.

In the example illustrated in FIG. 16A, it is specified that transport block TB stores four code block groups CBG, i.e., code block groups CBG #1 through CBG #4. Here, it is assumed that two code blocks CB, i.e., code blocks CB1 and CB2 are transmitted to the user equipment 2 by using this transport block TB. In such a case, code block CB1 is stored in code block group CBG #1 and code block CB2 is stored in code block group CBG #2 instead of code blocks CB1 and CB2 being collectively stored in code block group CBG #1. In other words, regrouping is performed in such a manner that one code block CB is stored in one code block group CBG.

Figure 16B:
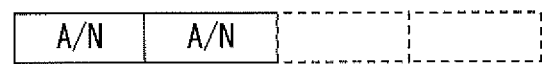

When receiving transport block TB, the user equipment 2 generates an ACK/NACK bit for each code block group CBG. The ACK/NACK bit indicates whether the code block group CBG has been successfully received. Then, the user equipment 2 generates an ACK/NACK bit for, for example, the code block group CBG in which the code block CB is stored. In the example illustrated in FIG. 16B, ACK/NACK bits are generated respectively for code block groups CBG #1 and CBG #2. In other words, a 2-bit feedback signal is generated.

This feedback signal is transmitted from the user equipment 2 to the base station 1. Thus, the base station 1 can recognize the number of code block groups CBG that contain data. Specifically, the base station 1 recognizes that data is stored only in two code block groups CBG among the specified code block groups CBG, although it is specified that transport block TB includes four code block groups CBG.

Figure 16C:
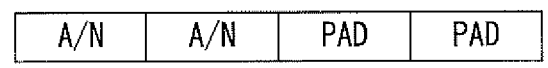

However, when it is desirable that the number of bits in a feedback signal be constant, padding bits matching the difference between the number (i.e. "M") of code block groups CBG and the number (i.e. "N") of code blocks CB may be used. Specifically, M-N padding bits are inserted into a feedback signal. In the example of FIG. 16C, two padding bits are inserted following the ACK/NACK bits to form a 4-bit feedback signal.

In the fourth embodiment, when the number of code blocks CB is smaller than the number of code block groups CBG, the granularity of the code block groups CBG is made finer. Therefore, the use efficiency of resources (such as a Physical Downlink Shared Channel and a Physical Uplink Shared Channel) increases for data retransmissions. Also, the fourth embodiment can be applied also to a case in which the number of retransmitted code block groups CBG or code blocks CB is smaller than the number of code block groups CBG or code blocks CB in the initial transmission (or the number of code block groups CBG or code blocks CB in the previous retransmission). Further, code block groups CBG originally intended to be retransmitted can be regrouped into code block groups CBG having a finer granularity for each of the code block groups CBG (specifically, code block groups CBG each having fewer code blocks CB such as one code block CB for one code block group CBG).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:
1. A base station device comprising:
a transmitter configured to transmit a transport block that includes a plurality of code block groups; and
a receiver configured to receive a confirmation signal which indicates that one or more code block groups of the plurality of code block groups has not been successfully received, wherein
the transmitter transmits a control signal when the receiver receives the confirmation signal, and
wherein the control signal comprises first information that indicates retransmission of the one or more code block groups of the plurality of code block groups to be received and second information that indicates whether the earlier received one or more code block groups of the plurality of code block groups stored in a buffer are combinable with the one or more code block groups of the plurality of code block groups to be received to recover data.

2. The base station device of claim 1, wherein the transmitter retransmits one or more code block groups from the plurality of code block groups indicated by the received confirmation signal.

3. The base station device of claim 1, wherein the one or more code block groups being retransmitted correspond to the received one or more code block groups.

4. The base station device of claim 1, wherein the control signal indicates downlink control information (DCI).

5. The base station device of claim 1, wherein the confirmation signal includes an ACK/NACK bit for each code block group.

6. The base station device of claim 4, wherein the control signal is included in a downlink control signal that controls PDSCH for transmitting data from the base station device.

7. The base station device of claim 6, wherein the control signal includes modulation scheme (MCS) information, redundancy version (RV) information, new data indicator (NDI) information and hybrid automatic repeat request (HARQ) information.

8. The base station device of claim 7, wherein the redundancy version information indicates the redundancy version of a hybrid automatic repeat request sequence, the new data indicator information indicates whether the data being transmitted in the slot is new data.

9. The base station device of claim 1, wherein the receiver further receives the confirmation signal that indicates whether the transport block have been successfully received, and the transmitter retransmits the corresponding transport block according to the confirmation signal.

10. A user equipment comprising:
a receiver configured to receive a transport block that includes a plurality of code block groups and receive a control signal; and
a transmitter configured to transmit a confirmation signal that indicates whether each of the plurality of code block groups is successfully received by the receiver, wherein
the receiver receives the control signal after the transmitter transmits the confirmation signal, and
wherein the control signal comprises
first information that indicates retransmission of one or more of the plurality of code block groups to be received and
second information that indicates whether the earlier received one or more of the plurality of code block groups stored in a buffer are combinable with the one or more of the plurality of code block groups to be received to recover data.

11. The user equipment of claim 10, wherein the receiver receives one or more code block groups from the plurality of code block groups indicated by the transmitted confirmation signal.

12. The user equipment of claim 10, wherein the one or more code block groups being retransmitted correspond to the received one or more code block groups.

13. The user equipment of claim 10, wherein the control signal indicates downlink control information (DCI).

14. The user equipment of claim 10, wherein the confirmation signal includes HARQ-ACK information bits which have a one-to-one mapping with the code block groups.

15. The user equipment of claim 13, wherein the control signal is included in a downlink control signal that controls PDSCH for transmitting data from a base station device.

16. The user equipment of claim 15, wherein the control signal includes modulation scheme (MCS) information, redundancy version (RV) information, new data indicator (NDI) information and hybrid automatic repeat request (HARQ) information.

17. The user equipment of claim 16, wherein the redundancy version information indicates the redundancy version of a hybrid automatic repeat request sequence, the new data indicator information indicates whether the data being transmitted in the slot is new data.

18. The user equipment of claim 10, wherein the receiver further receives the corresponding transport block according to the confirmation signal.

19. A base station device comprising:
a transmitter configured to transmit a transport block that includes a plurality of code block groups; and
a receiver configured to receive a confirmation signal which indicates that one or more code block groups of the plurality of code block groups has not been successfully received, wherein
the transmitter transmits a control signal when the receiver receives the confirmation signal, and
the control signal comprises
first information that indicates retransmission of the one or more code block groups of the plurality of code block groups to be received and
second information that indicates the one or more code block groups of the plurality of code block groups to be received to recover data without using earlier received one or more code block groups of the plurality of code block groups.

20. A user equipment comprising:
a receiver configured to receive a transport block that includes a plurality of code block groups and receive a control signal; and
a transmitter configured to transmit a confirmation signal that indicates whether each of the plurality of code block groups is successfully received by the receiver, wherein
the receiver receives the control signal after the transmitter transmits the confirmation signal, and
wherein the control signal comprises
first information that indicates retransmission of one or more of the plurality of code block groups to be received and
second information that indicates the one or more code block groups of the plurality of code block groups to be received to recover data without using earlier received one or more code block groups of the plurality of code block groups.

* * * * *